Oct. 15, 1957 D. T. AYERS, JR 2,809,725
VARIABLE RATIO BRAKE LEVER
Filed Oct. 19, 1953 3 Sheets-Sheet 1

INVENTOR
DAVID T. AYERS JR.
BY John Y. Phillips
ATTORNEY

Oct. 15, 1957   D. T. AYERS, JR   2,809,725
VARIABLE RATIO BRAKE LEVER
Filed Oct. 19, 1953   3 Sheets-Sheet 2

INVENTOR
DAVID T. AYERS JR.
BY John V. Phillips
ATTORNEY

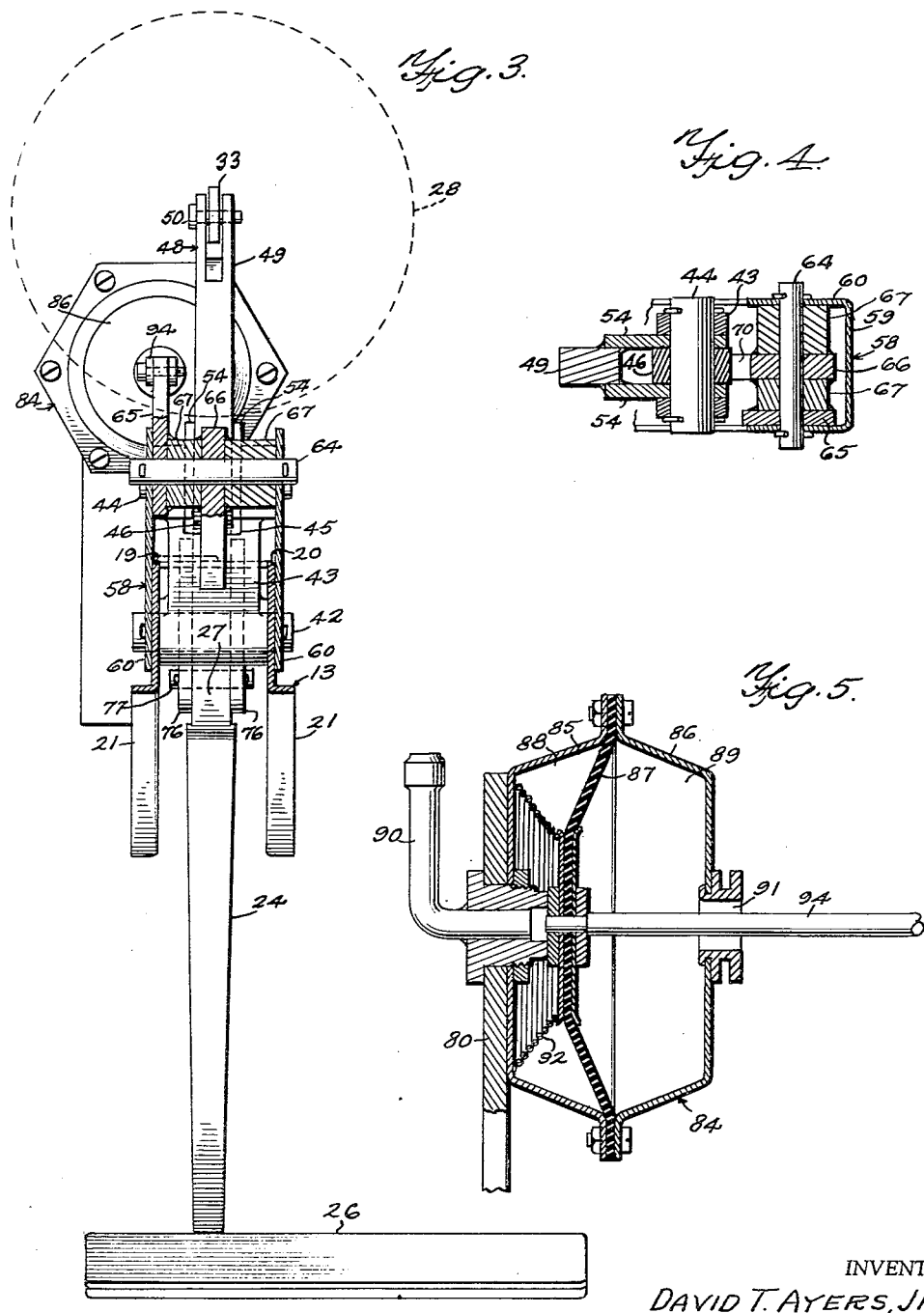

United States Patent Office 2,809,725
Patented Oct. 15, 1957

2,809,725

VARIABLE RATIO BRAKE LEVER

David T. Ayers, Jr., Birmingham, Mich., assignor to Kelsey-Hayes Company, a company of Delaware Application October 19, 1953, Serial No. 386,943

15 Claims. (Cl. 188—152)

This invention relates to a brake operating mechanism, and more particularly to a pedal mechanism for operating the booster brake wherein the pedal lever ratio is increased upon a failure of power in the booster motor.

As is well known, most vehicle booster brake mechanisms are so constructed that a part of the braking force is generated by the foot of the operator and a part by the booster motor. These mechanisms also are so constructed that upon a failure of power in the booster motor, the operator can apply the brakes by foot pressure alone. This requires the exertion of considerable force by the operator, and even more force is required where a low brake pedal is employed with limited travel between the normal off positions of the parts and the fully brake applied positions.

An important object of the present invention is to provide a novel mechanism for transmitting movements from a normally low brake pedal to the operating and controlling means for the booster motor and wherein, upon a failure of power in the booster motor, the pedal moves to a higher normal off position and provides greater lever ratios to facilitate foot application of the brakes.

A further object is to provide such a mechanism which is particularly adapted for use with a low brake pedal of the depending type supported rearwardly of the fire wall of the vehicle.

A further object is to provide a brake operating mechanism of the type referred to wherein the bracket for supporting the brake pedal is utilized also for supporting certain parts of the present mechanism which functions to provide a longer lever arm mechanism for the foot operation of the brakes upon a failure of power in the booster motor.

A further object is to provide a mechanism of this character wherein one of the motion transmitting devices between the brake pedal and the booster operating rod comprises a pair of pivoted members which turn as a unit about a predetermined axis when fluid pressure is present for operating the booster motor, but wherein upon a failure in booster motor power, the pivotally connected elements of such device are automatically turned with respect to each other and locked in a predetermined relative relationship, in which case the brake pedal automatically is moved to a higher normal off position and motion is transmitted by rocking movement of one of the pivoted members about a different axis to provide a greater leverage ratio for the foot operation of the brakes.

Other objects and advantages of the invention will become apparent during the course of the following description.

In the drawings I have shown one embodiment of the invention. In this showing:

Figure 3 is a section taken substantially on line 3—3 of Figure 1;

Figure 4 is a detail sectional view of certain of the elements of the device taken substantially on line 4—4 of Figure 1; and Figure 5 is an enlarged sectional view through the motor for changing the brake pedal between its two off positions, parts being shown in elevation.

Figure 1:
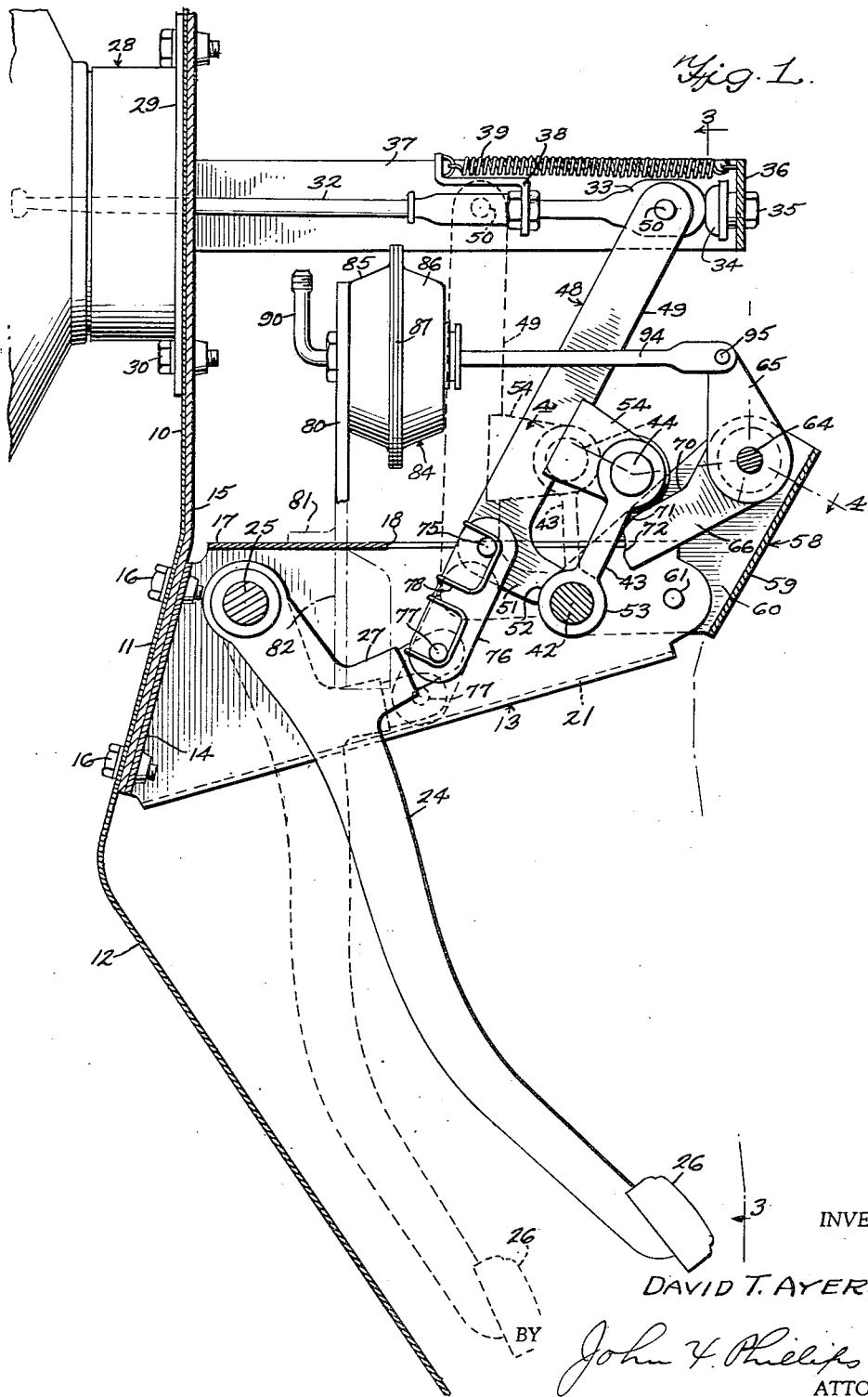
Figure 1 is a side elevation of the mechanism and associated parts, certain elements of the construction being shown in section, the brake pedal being shown in solid lines in the normal off position which it will occupy when power is available for the booster motor, the pedal and other parts being shown in dotted lines in the fully brake applied positions.
Figure 2:
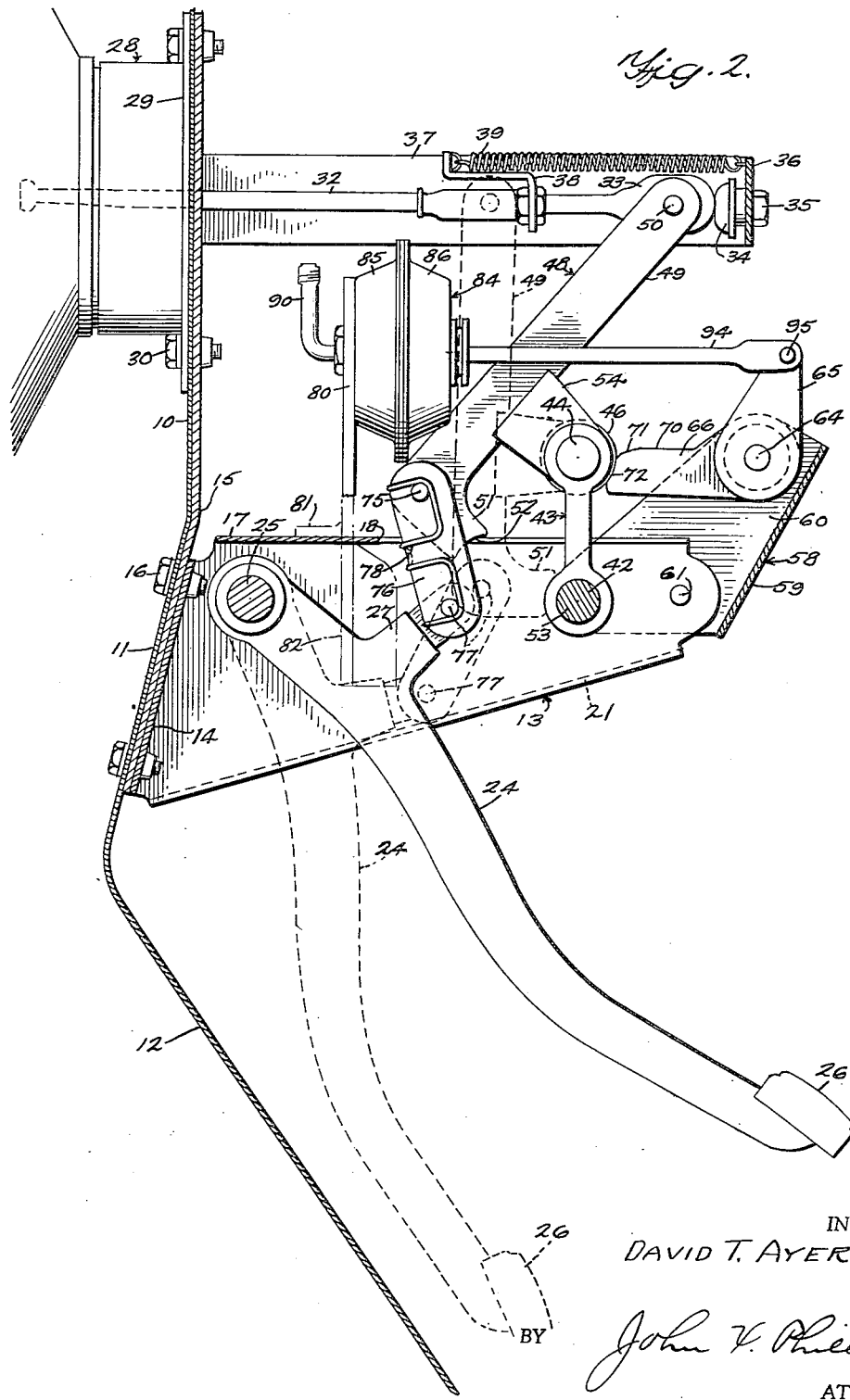
Figure 2 is a similar view showing the brake pedal and associated elements in solid lines in the positions which they will automatically assume when no power is available for the booster motor, the pedal and certain parts operated thereby being shown in dotted lines in the fully brake applied positions.

Referring to Figures 1 and 2, the numeral 10 designates the fire wall of the vehicle having a downwardly and forwardly sloping intermediate portion 11 beneath which the wall slopes downwardly and rearwardly as at 12 to form the usual vehicle toe board. To the wall portion 11 is secured a bracket 13 of substantially inverted U shape in cross section. This bracket has an end wall 14 seated against a reinforcing plate 15, and the wall portion 11, reinforcing plate 15, and wall 14 are secured together by bolts 16. The bracket 13 further comprises a top wall 17, cut away as at 18, and side walls 19 and 20 (Figure 3), and the bottom of the bracket 13 is provided with outstanding reinforcing flanges 21.

This bracket is conventional on a certain type of motor vehicle to pivotally support a brake pedal 24 shown in the present instance as being pivotally supported by a cross shaft 25 extending through the walls 19 and 20 of the bracket 13. The pedal lever is provided at its lower end with a conventional pedal pad 26. The pedal is provided at a point remote from its free end and relatively close to the shaft 25 with a rearward projection 27 for a purpose to be described.

The reinforcing plate 15 extends upwardly through a substantial portion of the height of the vertical section of the fire wall 10 as shown in Figures 1 and 2. Forwardly of such portion of the fire wall is mounted a booster brake mechanism indicated as a whole by the numeral 28, and which mechanism may be of any desired type. The booster mechanism accordingly need not be illustrated in detail. This mechanism is shown as being provided with a flange 29 seated against the vertical portion of the fire wall 10. Bolts 30 pass through the flange 29 and through the fire wall 10 and upper end of the reinforcing plate 15 to fix the booster brake mechanism in proper position.

In accordance with conventional practice, the booster brake mechanism is operated and controlled by a push rod 32 which normally has definite linkage connection with the brake pedal to be operated thereby through a constant leverage ratio. The present construction, as further described below, provides for changing such ratio. The rod 32 in the present instance is shown as being provided with a flattened end 33 engageable in the off positions of the parts shown in solid lines in Figure 1 with a resilient bumper 34 fixed as at 35 to the end wall 36 of a U-shaped bracket 37 fixed to the plate 15 in any suitable manner. A bracket 38 is carried by the rod 32. One end of a tension spring 39 is connected to the upper forward end of the bracket 38, and the rear end is connected to the bracket wall 36, thus biasing the rod 32 to the off position shown in solid lines in Figure 1.

A supporting shaft 42 is carried by the side walls 19 and 20 of the bracket 13 and pivotally supports a normally upwardly and rearwardly extending link 43 the upper end of which carries a shaft 44, as more clearly shown in Figure 4. The link 43 is bifurcated at its upper end as at 45 to form a space for the reception of a roller 46 rotatable on the shaft 44. This roller is spaced from the arms of the link 43 formed by the bifurcation 45, for a purpose to be described.

A bell crank lever 48 has an elongated upper arm 49 connected by a pivot pin 50 to the end 33 of the operating rod 32. The lower arm 51 of the bell crank lever normally extends downwardly and rearwardly as in solid lines in Figure 1 and has an arcuate end 52 normally fitting and seating against the hub 53 formed at the lower end of the link 43. Opposite arms 54 are welded or otherwise secured to the lever arm 49 and straddle the roller 46. These arms accordingly are pivotally connected to the shaft 44. As further described below, the bell crank lever 48, link 43, and arms 54 under normal operating conditions turn as a unit about the axis of the shaft 42, but when no power is present for operating the booster motor, the shaft 44 becomes the pivot for the bell crank lever 48.

A supplemental bracket 58 straddles the free end of the bracket 13 and extends upwardly and rearwardly as shown in Figures 1 and 2. The bracket 58 has a base wall 59 and side walls 60 which lie outwardly of and in contact with the outer faces of the bracket walls 19 and 20. Each side wall 19 and 20 is riveted or otherwise fixed as at 61 to the adjacent side wall of the bracket 58, and this bracket also receives the ends of the shaft 42, thus effectively fixing the bracket 58 with respect to the bracket 13.

A pivot pin 64 extends through the side walls 60 of the bracket 58 (Figure 3). A crank arm 65 is mounted on the shaft 64 adjacent one end thereof, as shown in Figure 3, for a purpose to be described. A cam arm 66 is mounted on the shaft 64 intermediate the ends thereof, and spacers 67 are arranged between the crank arm 65 and the cam arm 66 and between the cam arm and the opposite wall 60 of the bracket 58. These spacers are welded or otherwise fixed to the arms 65 and 66, and accordingly they turn as a unit therewith.

The cam arm 66 is provided with an upper edge 70 which is almost radial with respect to the shaft 64. Toward the free end of the cam arm 66, the edge 70 slopes downwardly as at 71 and the cam arm terminates in an end 72 of arcuate shape corresponding to the curvature of the roller 46. The cam arm 66 is free of the roller 46 under normal brake operating conditions as shown in Figure 1, and the roller 46 seats against the cam face 72 to fix the link 43 in the solid line position shown in Figure 2 when no power is available for the booster motor.

The bell crank lever 48, at the junction of the arms 49 and 51 thereof, carries a pivot pin 75 connecting the bell crank lever to the upper ends of links 76, the lower ends of these links being pivotally connected as at 77 to the brake pedal projection 27. Anti-rattling springs 78 are carried by the links 76 in mechanical engagement with the pivot pins 75 and 77.

A vertical bracket 80 extends above the bracket 13 and is provided with a foot portion 81 fixed in any suitable manner to the bracket wall 17, and is further provided with an extension 82 lying outwardly of the bracket wall 19 and fixed thereto in any suitable manner. A pressure responsive device 84 is carried by the upper end of the bracket 80. This device comprises a pair of casing sections 85 and 86 between which is clamped a diaphragm 87 dividing the device into a pair of chambers 88 and 89 the former of which communicates with one end of a pipe 90. This pipe in turn is adapted for connection with the same source of fluid pressure which operates the booster mechanism 28, for example, the intake manifold of the vehicle engine. The chamber 89 communicates with the atmosphere as at 91, and the diaphragm 87 is urged toward the right in Figure 5 by a spring 92. Whenever vacuum is present in the chamber 88, the diaphragm 87 will occupy the position shown in Figure 5, and upon a failure of power for the booster motor, the spring 92 will move the diaphragm 87 toward the right. A rod 94 is connected at one end to the diaphragm 87 and is pivotally connected as at 95 at its opposite end to the upper end of the crank arm 65.

*Operation*

The parts occupy the normal positions shown in solid lines in Figure 1 when power is available for the booster 28 and the brakes are released. Assuming that the brake is to be applied, the operator will push downwardly on the pedal pad 26 to rock the lever 24 about the axis of the shaft 25. This operation swings the projection 27 and its pin 77 in a clockwise direction about the shaft 25, transmitting a pull through links 76 to the bell crank lever 48 through the pin 75. The lever end 51 of the bell crank lever will remain seated against the hub 53, and accordingly the bell crank lever, the link 43 and arms 54 will turn as a unit about the axis of the shaft 42, and the pin 50 at the upper end of the bell crank lever 48 will move the rod 32 toward the left as shown in Figures 1 and 2 to actuate the booster brake mechanism. The rod 32 of course will move against the tension of the return spring 39 and against the conventional resistances encountered in the booster motor. With the arrangement shown, this provides approximately a 1:1 lever ratio between movement of the pedal pad 26 and movement of the rod 32, it being apparent that the distance between the solid line position of the pedal pad and the dotted line position thereof is approximately equal to the solid and dotted line positions of the pin 50 in Figure 1. Under such conditions, vacuum will be present in the chamber 88 (Figure 5) and the diaphragm 87 will be maintained in the left-hand position shown in such figure, the crank arm 65 accordingly occupying the position shown in Figure 1 and the cam arm 66 being inoperative. This normal operation provides for a relatively short pedal pad travel, thus rendering it possible to use a low pedal pad which facilitates the transferring of the operator's right foot between the accelerator pedal and the brake pedal.

Assuming that there is a failure of power in the booster motor, for example if the vacuum line (not shown) from the booster motor to the intake manifold should break, atmospheric pressure will be present in the chamber 88 (Figure 5), and the spring 92 will move the diaphragm 87 toward the right, thus similarly moving the rod 94 and turning the crank 65 clockwise to the position shown in Figure 2. Upon the initiation of such movement, the upper edge 70 of the cam will engage the roller 46 to transmit an upward force thereto and rock the link 43 in a counterclockwise direction about the axis of the shaft 42. The roller 46 travels over the cam edge 71 and comes to rest against the cam face 72. It will be noted that at least a portion of the cam face 72 will extend above a plane through the axes of the shafts 44 and 64, and accordingly the cam arm 70 acts as a thrust member to prevent the upper end of the link 43 from swinging toward the right from the position shown in Figure 2.

When the pressure responsive device 84 performs the functions referred to above, the swinging movement of the link 43 swings the arm 49 of the bell crank lever 48 about the axis of the pin 50, this pin being maintained in its normal positon by the biasing spring 38. Thus the bell crank lever will assume the solid line position shown in Figure 2 and in swinging to such position, it will transmit an upward force to the brake pedal 24 through links 76, thus moving the brake pedal to the off position shown in solid lines in Figure 2.

If it now becomes necessary to operate the brakes, the operator will depress the brake pedal. The pedal will turn about the axis of the shaft 25 and will again transmit a pull through links 76 to the pin 75 and thus to the bell crank lever 48. Under these conditions, however, the link 43 will remain stationary and the bell crank lever will rock about the axis of the shaft 44. The bell crank lever is capable of moving to the extreme "on" brake position shown in Figure 2, which corresponds to the position shown in dotted lines in Figure 1, while at the same time the pedal pad 26 will have traveled approximately twice the distance of travel which occurs when power is present for operating the booster motor.

Thus, for foot operation, a leverage ratio of approximately 2:1 will be provided, thereby greatly facilitating the foot application of the brakes.

Whenver vacuum becomes available for operating the booster motor, the diaphragm 87 (Figure 5) will again move to the left to rock the arms 65 and 66 back to the normal positions shown in Figure 1, and the brake pedal and associated elements will re-assume the normal off positions shown in Figure 1.

It will be noted that the present device lends itself particularly well to installation with a conventional bracket now in use for supporting a depending pedal of the normally low type employed for operating booster brake mechanisms. The structure is simple and highly efficient in operation, and the design of the parts can be made such as to provide any increased leverage ratio for foot application of the brakes. For example, by shortening the link 43, that is, by lowering the shaft 44, a smaller increase in the leverage ratio will be provided for foot pedal operation. On the contrary, by lengthening the link 43 and raising the shaft 44, a more increased leverage ratio can be provided.

It is to be understood that the form of the invention shown is to be taken as being illustrative, the scope of the invention being defined in the appended claims.

I claim:

1. A brake operating mechanism comprising a brake operating member, a brake pedal mounted for turning movement on a fixed axis, and a motion transmitting mechanism between said pedal and said brake operating member, said mechanism comprising a lever pivotally connected at one end to said brake operating member, means connecting said pedal to said lever, a control member pivotally connected to said lever on a predetermined axis, said control member being mounted for turning movement on a second fixed axis spaced from said predetermined axis, said lever having a portion engaging said control member whereby said lever and said control member normally turn bodily about said second fixed axis, and means for rocking said control member about said second fixed axis and to bodily move said lever to a position from which it rocks about said predetermined axis when said brake pedal is operated.

2. A brake operating mechanism comprising a brake operating member, a brake pedal mounted for turning movement on a fixed axis, and a motion transmitting mechanism between said pedal and said brake operating member, said mechanism comprising a lever pivotally connected at one end to said brake operating member and having mechanical connection at its other end with said brake pedal, a control member mounted for turning movement on a second fixed axis and having a pivotal connection on a predetermined axis with said lever intermediate said second fixed axis and said one end of said lever, said lever at said other end having an offset engaging said control member adjacent said second fixed axis to prevent turning movement of said lever about said predetermined axis whereby said lever and said control member turn as a unit about said second fixed axis upon operation of the brake pedal, and means for swinging said control member about said second fixed axis to disengage said offset from said control member whereby, upon operation of said brake pedal, said lever will rock about said predetermined axis.

3. A brake operating mechanism comprising a brake pedal mounted for rocking movement on a fixed axis, a brake operating member, means biasing said brake operating member to a normal off position, and a motion transmitting mechanism connected between said brake pedal and said brake operating member, said mechanism comprising a lever pivotally connected at one end to said brake operating member and having mechanical connection at its other end with said brake pedal, a control member substantially parallel to and spaced from said lever, said control member being mounted for turning movement adjacent one end about a second fixed axis adjacent said other end of said lever, the other end of said control member having a normal position and being pivotally connected on a predetermined axis to said lever intermediate the ends thereof, said lever having an offset engaging said control member adjacent said second fixed axis whereby said lever and said control member rock as a unit about said second fixed axis upon operation of the brake pedal, and means for moving said other end of said control member to bodily move said other end of said lever while said biasing means maintains said brake operating member in its normal off position, whereby, upon operation of said brake pedal, said lever will be rocked about said predetermined axis.

4. Apparatus constructed in accordance with claim 3 wherein said means for moving said other end of said control member comprises a cam rockable about a fixed axis.

5. Apparatus constructed in accordance with claim 3 wherein said means for moving said other end of said control member comprises a normally inoperative cam mounted for turning movement on a third fixed axis and having an edge portion engageable with said other end of said control member to effect said movement thereof, said cam having an end, engageable with said other end of said control member after the latter has been moved, lying between said third fixed axis and said predetermined axis to prevent movement of said other end of said control member back to normal position.

6. Apparatus constructed in accordance with claim 3 wherein said means for moving said other end of said control member comprises a cam rockable about a fixed axis, an operating crank fixed to said cam, and a motor connected to said crank, said motor biasing said crank to a position in which said cam is inoperative and being energizable to render said cam operative.

7. A brake operating mechanism for motor vehicles comprising a brake pedal pivoted for turning movement at one end on a fixed axis and having its other end extending downwardly and rearwardly from such axis, a brake operating rod spaced above said axis, means biasing said brake operating rod to a normal off position, and motion transmitting means connected between said brake pedal and said brake operating rod, said mechanism comprising a lever pivotally connected at its upper end to said brake operating rod and having mechanical connection at its lower end with said pedal, a control member having a normal position and being offset rearwardly from said lever, said control member being mounted for turning movement at its lower end about a second fixed axis and being pivotally connected at its upper end to said lever on a predetermined axis, said second fixed axis and said predetermined axis lying in a plane offset from and substantially parallel to said lever, said lever having an offset at its lower end engaging said control member adjacent said second fixed axis whereby, when said brake pedal is depressed, a pull is transmitted to said lever to rock said lever and said control member as a unit about said second fixed axis, said predetermined axis having a normal position which it occupies when said brake operating rod is in its normal position, and means for swinging said control member to another position about said second fixed axis to move the lower end of said lever forwardly and upwardly, and for elevating said brake pedal, said offset, when said predetermined axis is so moved, being free of said control member whereby, upon depression of said brake pedal, said lever turns about said predetermined axis.

8. Apparatus constructed in accordance with claim 7 wherein said means for swinging said control member comprises a rocking cam, and means for rocking said cam, said cam, when said control member is swung thereby, lying between the rocking axis of said cam and said predetermined axis to prevent movement of the upper end of said control member back to its normal position.

9. Apparatus constructed in accordance with claim 7 wherein said means for swinging said control member comprises a rocking cam, a crank fixed to said cam, and a motor connected to said crank and biased to a position in which said cam is inoperative, said motor being energizable to rock said crank to move said cam and effect said swinging of said control member, said cam, when said control member is so swung lying between such axis and the rocking axis of said cam.

10. A brake operating mechanism comprising a downwardly and rearwardly sloping brake pedal mounted for turning movement on a fixed axis at its upper end, a brake operating rod spaced above said pedal, means biasing said brake operating rod to a normal off position, a lever pivotally connected at its upper end to said brake operating rod, said lever sloping downwardly and forwardly and having mechanical connection at its lower end with said pedal, a control link having its lower end mounted for turning movement on a second fixed axis, an arm extending rearwardly from said lever and pivotally connected to the upper end of said link for rocking movement relative thereto on a predetermined axis spaced above said second axis, said predetermined axis and said second fixed axis lying in a plane substantially parallel to and arranged rearwardly of said lever, the lower end of said link having a hub, an offset carried by the lower end of said lever and normally engaging said hub when said brake operating rod is in its normal off position, whereby, when said pedal is depressed, a pull will be transmitted to said lever endwise thereof and said lever and said link will rock as a unit about said second fixed axis, and a cam device for swinging the upper end of said link forwardly about said second fixed axis to swing the lower end of said lever forwardly and upwardly about its pivotal connection with said brake operating rod, thus swinging said brake pedal to a higher position and moving said offset out of engagement with said hub, whereby, upon operation of the brake pedal, a pull will be transmitted endwise to said lever to effect rocking movement thereof about said predetermined axis.

11. Apparatus constructed in accordance with claim 10 wherein said cam device comprises a cam element mounted for turning movement on a third fixed axis rearwardly of said link, said link carrying a roller mounted to turn about said predetermined axis and said cam having an upper edge engageable with said roller to swing the upper end of said link forwardly upon turning movement of said cam element in one direction.

12. Apparatus constructed in accordance with claim 10 wherein said cam device comprises a cam element mounted for turning movement on a third fixed axis rearwardly of said link, said link carrying a roller mounted to turn about said predetermined axis and said cam having an upper edge engageable with said roller to swing the upper end of said link forwardly upon turning movement of said cam element in one direction, means biasing said cam element for turning movement in said direction, and power means energizable for turning said cam element in the other direction.

13. Apparatus constructed in accordance with claim 10 wherein said cam device comprises a cam element mounted for turning movement on a third fixed axis rearwardly of said link, said link carrying a roller mounted to turn about said predetermined axis and said cam having an upper edge engageable with said roller to swing the upper end of said link forwardly upon turning movement of said cam element in one direction, a crank fixed with respect to said cam element, a differential fluid pressure operated motor having a pressure movable element mechanically connected to said crank, and means biasing said pressure movable element for movement in one direction to turn said cam element in said direction, said motor being energizable to swing said cam element in the other direction.

14. In combination with a booster brake mechanism having a rod axially movable to control said booster mechanism, and a brake pedal mounted to rock on a fixed axis and depending downwardly at an angle from such axis, motion transmitting connections for translating rocking movement of said pedal into axial movement of said rod, said connections comprising a lever having pivotal connection at its upper end with said rod and having mechanical connection at its lower end with said pedal, said lever being mounted to normally rock on a fixed axis adjacent the lower end of said lever, and power operated means connected to said lever to swing it bodily about its pivotal connection with said rod and to render it operable for rocking movement on another axis between said fixed axis and the pivotal connection of said lever with said rod.

15. In combination with a vehicle fire wall and a booster mechanism fixed to said wall forwardly thereof and having a rearwardly extending, substantially horizontal rod axially movable for controlling said booster mechanism, and a brake pedal mounted substantially below said rod and mounted for rocking movement on a fixed axis from which said pedal slopes downwardly and rearwardly, motion transmitting connections for transmitting rocking movements of said pedal into axial movements of said rod, said connections comprising a lever pivotally connected at its upper end to said rod and having mechanical connection at its lower end with said pedal, and a control member arranged rearwardly of said lever, said control member being mounted for rocking movement on a second fixed axis and having pivotal connection with said lever on a predetermined axis between said second fixed axis and said rod, said lever having an abutment normally engaging said control member adjacent said fixed axis to prevent turning movement of said lever in one direction about said predetermined axis whereby downward forces transmitted from said pedal to said lever will cause said lever and said control member to rock as a unit about said second fixed axis, and means for swinging said control member about said second fixed axis to a second position and supporting it in such position whereby said lever will be swung forwardly about its pivotal connection with said rod and downward forces on said lever will cause it to rock about said predetermined axis to axially move said rod.

References Cited in the file of this patent

UNITED STATES PATENTS

| 1,134,685 | Kramer | Apr. 6, 1915 |
| 2,005,019 | Bertrand | June 18, 1935 |
| 2,024,788 | Wine | Dec. 17, 1935 |
| 2,037,868 | Wall | Apr. 21, 1936 |
| 2,037,869 | Wall | Apr. 21, 1936 |
| 2,626,065 | Sanders et al. | Jan. 20, 1953 |
| 2,755,891 | Levell et al. | July 24, 1956 |

FOREIGN PATENTS

| 331,746 | France | Sept. 28, 1903 |
| 278,393 | Great Britain | Jan. 4, 1929 |